US012591856B2

(12) United States Patent
Bonnell et al.

(10) Patent No.: US 12,591,856 B2
(45) Date of Patent: Mar. 31, 2026

(54) SYSTEM AND METHODS FOR USING DRONES IN DISPERSED WELDING ENVIRONMENTS

(71) Applicant: ILLINOIS TOOL WORKS INC., Glenview, IL (US)

(72) Inventors: Jason Bonnell, Appleton, WI (US); Praveen Dandu, Appleton, WI (US); Leland Falde, Jackson, MI (US); Stephen P. Ivkovich, East Lansing, MI (US); Adam Pliska, Neenah, WI (US); Tret West, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 816 days.

(21) Appl. No.: 16/988,887

(22) Filed: Aug. 10, 2020

(65) Prior Publication Data

US 2021/0065140 A1     Mar. 4, 2021

Related U.S. Application Data

(60) Provisional application No. 62/893,934, filed on Aug. 30, 2019.

(51) Int. Cl.
*G06Q 10/20* (2023.01)
*B23K 37/00* (2025.01)
(Continued)

(52) U.S. Cl.
CPC ............. *G06Q 10/20* (2013.01); *B23K 37/00* (2013.01); *B60W 60/00* (2020.02); *B63B 35/00* (2013.01);
(Continued)

(58) Field of Classification Search
CPC .... B23K 37/00; B23K 9/0956; B23K 9/1087; B23K 9/0953; B23K 9/095; G09B 19/00;
(Continued)

(56) References Cited

U.S. PATENT DOCUMENTS 6,445,964 B1     9/2002   White et al.
8,747,116 B2     6/2014   Zboray et al.
(Continued)

FOREIGN PATENT DOCUMENTS

CN         1490135          4/2004
CN         101745765        6/2010
(Continued)

OTHER PUBLICATIONS

A. Saini and D. Singh, "Development of Computer Vision based Robust Approach for Joggled Fish Plate Detection in Drone Images," 2018 9th International Symposium on Signal, Image, Video and Communications (ISIVC) <https://ieeexplore.ieee.org/document/8709170?source=IQplus> (Year: 2018).*
(Continued)

*Primary Examiner* — Jerry O'Connor
*Assistant Examiner* — Michael R Koester
(74) *Attorney, Agent, or Firm* — IMcAndrews, Held & Malloy, Ltd.

(57)     ABSTRACT

Systems and methods for using drones in dispersed welding applications are disclosed. In some examples, drones may be used in large and/or dispersed welding environments to quickly navigate the large distances and/or reach areas that might be more difficult for a person to reach. In some examples, the drones may use one or more attached devices to locate, identify, and/or collect information from welding equipment, welding workpieces, and/or welds within a (e.g., large and/or dispersed) welding environment.

20 Claims, 7 Drawing Sheets

(51) Int. Cl.

| | |
|---|---|
| *B25J 5/00* | (2006.01) |
| *B25J 11/00* | (2006.01) |
| *B60W 60/00* | (2020.01) |
| *B63B 35/00* | (2020.01) |
| *B64U 10/13* | (2023.01) |
| *B64U 101/30* | (2023.01) |
| *G05D 1/00* | (2024.01) |
| *G06K 7/14* | (2006.01) |
| *G06Q 10/0631* | (2023.01) |
| *H04W 4/38* | (2018.01) |
| *H04W 4/44* | (2018.01) |

(52) U.S. Cl.
CPC ......... *G05D 1/0011* (2013.01); *G06K 7/1413* (2013.01); *G06Q 10/063112* (2013.01); *H04W 4/38* (2018.02); *H04W 4/44* (2018.02); *B25J 5/005* (2013.01); *B25J 5/007* (2013.01); *B25J 11/005* (2013.01); *B64U 10/13* (2023.01); *B64U 2101/30* (2023.01); *B64U 2201/10* (2023.01)

(58) Field of Classification Search
CPC ........................... G09B 19/24; G05B 23/0294; G05B 19/0425; G05B 19/4183; G06Q 10/0833; G06F 30/13
See application file for complete search history.

(56) References Cited

U.S. PATENT DOCUMENTS

| | | | |
|---|---|---|---|
| 8,834,168 B2 | 9/2014 | Peters et al. | |
| 8,851,896 B2 | 10/2014 | Wallace et al. | |
| 8,911,237 B2 | 12/2014 | Postlethwaite et al. | |
| 9,011,154 B2 | 4/2015 | Kindig et al. | |
| 9,101,994 B2 | 8/2015 | Albrecht | |
| 9,196,169 B2 | 11/2015 | Wallace et al. | |
| 11,377,233 B1 * | 7/2022 | Cook | H04L 43/50 |
| 2006/0144835 A1 | 7/2006 | Pan et al. | |

| | | | |
|---|---|---|---|
| 2006/0207980 A1 * | 9/2006 | Jacovetty | B23K 9/1062 |
| | | | 219/130.5 |
| 2010/0176106 A1 | 7/2010 | Christensen et al. | |
| 2010/0213242 A1 | 8/2010 | Fujimoto et al. | |
| 2011/0290765 A1 | 12/2011 | Albrecht et al. | |
| 2012/0111843 A1 | 5/2012 | Beard et al. | |
| 2014/0091129 A1 | 4/2014 | Peters et al. | |
| 2016/0114418 A1 | 4/2016 | Jones et al. | |
| 2016/0214715 A1 * | 7/2016 | Meffert | B64U 20/87 |
| 2016/0267806 A1 * | 9/2016 | Hsu | G09B 19/24 |
| 2016/0340006 A1 * | 11/2016 | Tang | B63C 9/01 |
| 2018/0284737 A1 | 10/2018 | Cella | |
| 2019/0160591 A1 | 5/2019 | Kurosawa | |
| 2019/0339688 A1 * | 11/2019 | Cella | H04L 1/18 |
| 2020/0148348 A1 * | 5/2020 | Bradley | B64C 39/022 |

FOREIGN PATENT DOCUMENTS

| | | | | |
|---|---|---|---|---|
| CN | 102298858 | | 12/2011 | |
| CN | 102922089 A | * | 2/2013 | |
| CN | 104057202 | | 9/2014 | |
| CN | 205862571 | | 1/2017 | |
| CN | 107570924 | | 1/2018 | |
| CN | 207964736 | | 10/2018 | |
| DE | 10048000 | | 1/2002 | |
| JP | 2003200372 | | 7/2003 | |
| JP | 2009085894 A | * | 4/2009 | G01N 27/902 |
| JP | 6484695 | | 3/2019 | |
| JP | 2019117084 A | * | 7/2019 | |
| KR | 20150015782 | | 2/2015 | |
| WO | 2018232010 | | 12/2018 | |

OTHER PUBLICATIONS

Translation of CN-102922089-A (Year: 2013).*
Extended European Search Report, Application No. 20192683.9, mailed Jan. 28, 2021, 6 pages.
International Search Report from PCT application No. PCT/US2015/055844, dated Feb. 10, 2016, 12 pgs.

* cited by examiner

SYSTEM AND METHODS FOR USING DRONES IN DISPERSED WELDING ENVIRONMENTS

CROSS REFERENCE TO RELATED APPLICATIONS

This application claims priority to, and the benefit of, U.S. Provisional Application No. 62/893,934, titled "SYSTEMS AND METHODS FOR USING DRONES IN DISPERSED WELDING ENVIRONMENTS," filed Aug. 30, 2019, the entirety of which is hereby incorporated by references.

TECHNICAL FIELD

The present disclosure generally relates to systems and methods for using drones and, more particularly, to systems and methods for using drones in dispersed welding environments.

BACKGROUND

Welding assets may be employed in large (and/or dispersed) welding environments, such as construction sites, factories, manufacturing yards, and shipyards, for example. In such large welding environments, traveling from one area to another can take a considerable amount of time. Additionally, some areas may be difficult for people to reach.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for using drones in dispersed welding environments, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

Figures 1A, 1B, 1C, 1D, 1E:
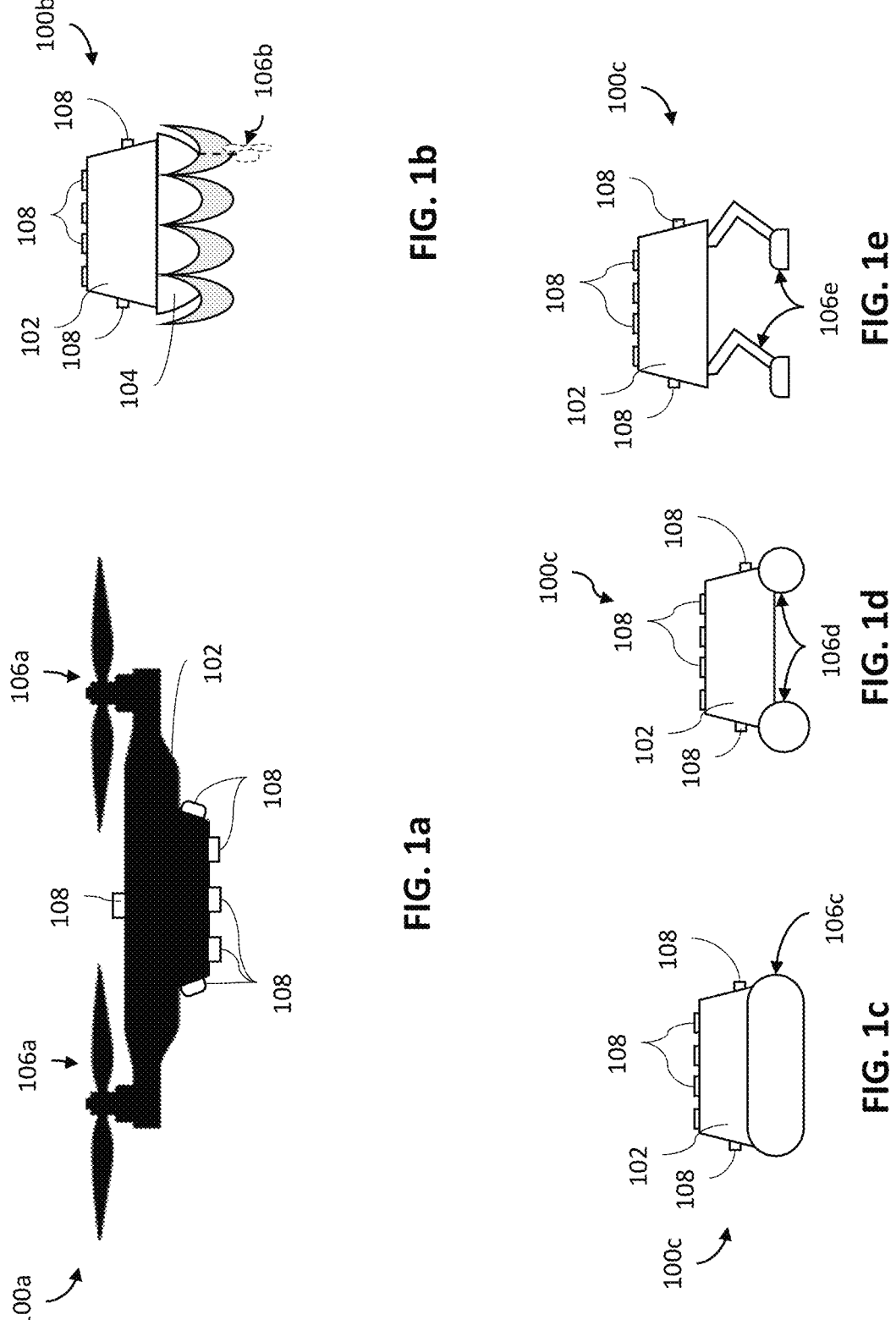
FIGS. 1a-1e depict various example drones that might be used in dispersed welding environments, in accordance with aspects of this disclosure.

The figures are not necessarily to scale. Where appropriate, the same or similar reference numerals are used in the figures to refer to similar or identical elements. For example, reference numerals utilizing lettering (e.g., drone 100a, drone 100b) refer to instances of the same reference numeral that does not have the lettering (e.g., drone 100).

DETAILED DESCRIPTION

Some examples of the present disclosure relate to using drones in large and/or dispersed welding environments to quickly navigate the large distances and/or reach areas that might be more difficult for a person to reach. In some examples, one or more aerial, land, and/or aquatic drones may use one or more attached devices to locate, identify, and/or collect information from welding equipment, welding workpieces, and/or welds within a (e.g., large and/or dispersed) welding environment. In some examples, the collected information may be relayed to a device in communication with the drone. In some examples, one or more drones may additionally, or alternatively, use one or more tools to perform one or more welding related operations within the welding environment.

Some examples of the present disclosure relate to a method, comprising collecting welding information from welding equipment, a welding workpiece, or a weld, via a drone, and relaying the welding information from the drone to a monitoring device in communication with the drone.

In some examples, collecting the welding information comprises locating or identifying the welding equipment, welding workpiece, or weld via a detection device or communication circuitry of the drone. In some examples, the detection device comprises a radar, sonar, audio, thermal, global positioning, radiographic, camera, barcode reader, ultrasonic, or optical device. In some examples, the communication circuitry is configured for communication using a WiFi protocol, a Zigbee protocol, a short wavelength ultra high frequency protocol, a near field communication protocol, or a cellular communication protocol.

In some examples, collecting the welding information comprises using a collection device of the drone. In some examples, the collection device comprises a sensor. In some examples, the sensor comprises a radar, sonar, audio, thermal, radiographic, ultrasonic, optical, barcode, or camera sensor. In some examples, the collection device comprises communication circuitry. In some examples, the communication circuitry is configured for communication using WiFi protocol, a Zigbee protocol, a short wavelength ultra high frequency protocol, a near field communication protocol, or a cellular communication protocol.

In some examples, collecting the welding information comprises periodically collecting the welding information according to a stored schedule, or collecting the welding information in response to reception of a command signal. In some examples, relaying the welding information to the device comprises carrying or transmitting the welding information to the device. In some examples, the drone is an autonomous or remote controlled drone. In some examples, the drone is an aerial drone, aquatic drone, or ground drone. In some examples, the welding information comprises location information, identification information, display panel information, status information, maintenance information, fault information, weld process information, part tracking information, job tracking information, activity information, or quality information.

In some examples, the method further comprises determining a location of the welding equipment, welding workpiece, or weld, and relaying the welding information and the location from the drone to the monitoring device in communication with the drone. In some examples, the method further comprises comparing the welding information to expected welding information, and relaying an error or alert to the monitoring device in response to the welding information being different from the expected welding information. In some examples, the welding information comprises identification information, and the expected welding information comprises expected identification information. In some examples, wherein collecting the welding information comprises receiving an expected location of the welding equipment, welding workpiece, or weld from an asset tracking system, and maneuvering the drone to the expected location via a propulsion or navigation system of the drone.

Some examples of the present disclosure relate to a welding system, comprising a collection device configured to collect welding information, and a drone configured to carry the collection device, the drone comprising processing circuitry, and memory circuitry comprising non-transient computer readable instructions that, when executed, cause the processing circuitry to move the drone to a location proximate a welding equipment, a welding workpiece, or a weld, collect welding information from the welding equipment, welding workpiece, or weld using the collection device, and relay the welding information to a monitoring device in communication with the drone. In some examples, the memory circuitry further comprises a stored schedule, and moving the drone to the location comprises moving the drone according to the stored schedule.

FIGS. 1a-1e show several examples of drones 100. FIG. 1a shows an example of an aerial drone 100a. FIG. 1b shows an example of an aquatic drone 100b. FIGS. 1c-1e show examples of ground drones 100c. As shown, each drone 100 is a vehicle configured for propulsion via remote and/or autonomous control. Each drone 100 has a body 102 or hull 104 with an affixed propulsion system 106. The propulsion system 106 differs depending on the type of drone 100. The aerial drone 100a shown in FIG. 1a is configured with a propeller propulsion system 106a, having multiple propellers (and/or propeller blades) affixed to the body 102 of the drone 100a. The aquatic drone 100b shown in FIG. 1b is configured with a water turbine propulsion system 106b affixed to its hull 104. The ground drones 100c shown in FIGS. 1c-1e are configured with a track propulsion system 406b, wheel propulsion system 106d, and leg propulsion system 106e, respectively.

In some examples the aerial drone 100a and/or aquatic drone 100b may instead have jet propulsion systems 106. While the aquatic drone 100b is shown floating on the water in the example of FIG. 1b, in some examples, the aquatic drone 100b may be a submersible and/or underwater drone. In some examples, a drone 100 may have multiple propulsions systems 106 (e.g., propeller, water turbine, and wheel/track/leg), and/or be a combination of the aerial, aquatic, and/or ground drones 100.

In the examples of FIGS. 1a-1e, each drone 100 includes a plurality of attachment ports 108 on the body 102. While a plurality of attachments ports 108 is shown on the body 102 of each drone 100 in FIGS. 1a-1e, in some examples, there may be only one (or no) attachment port 108. In some examples, each attachment port 108 may comprise a mechanical and/or electrical attachment mechanism configured to mechanically and/or electrically secure, retain, and/or couple one or more drone attachable (and/or detachable)

devices. In some examples, the one or more drone attachable devices may be integrated into the drone 100, rather than attached via a port 108.

Figure 2:
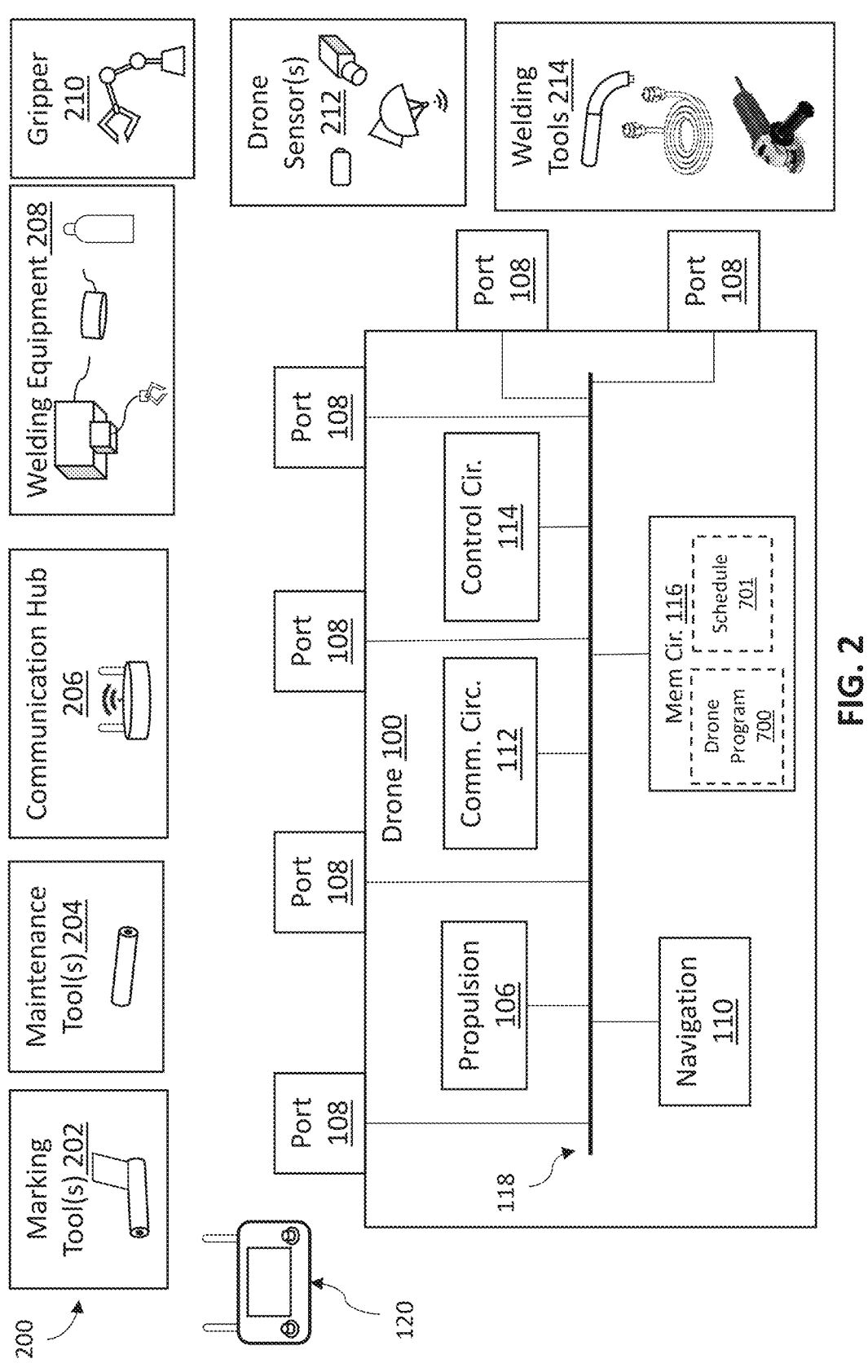
FIG. 2 is a block diagram showing components of the drones of FIGS. 1a-1e, in accordance with aspects of this disclosure.

FIG. 2 is a block diagram illustrating various functional components of an example drone 100, as well as various devices that might be attached to the drone 100 (e.g., via attachment ports 108). As shown, the drone 100 includes a propulsion system 106, navigation system 110, drone communication circuitry 412, drone control circuitry 414, drone memory circuitry 416, and a plurality of attachment ports 108, all in electrical communication with one another via a common electrical bus 118. In some examples, the drone 100 may further include an internal power source (e.g., battery) and/or a charging port (either through attachment port 108 or some other port).

In some examples, the navigation system 110 may be configured to maneuver, steer, and/or pilot the drone 100, autonomously and/or with the direction of a remote control 120. In some examples, the remote control may be configured to control the drone 100 via the propulsion system 106 and/or navigation system 110. In some examples, the drone communication circuitry 412 may be configured to communicate with the remote control 120. In some examples, the drone control circuitry 414 may comprise processing circuitry and/or one or more processors. As shown, the drone memory circuitry 416 includes a drone program 700 and drone schedule 701, further discussed below with respect to FIG. 7.

FIG. 2 shows various drone attachable devices 200 that may be coupled to the drones 100 (e.g., via the attachment ports 108). In some examples, one or more intermediary structures, mechanisms, fasteners, modules, etc. may be used to couple a drone attachable device 200 to the drone 100 (and/or attachment port 108). In some examples, a drone attachable devices 200 may be coupled to a drone 100 via two or more attachment ports 108.

In the example of FIG. 2, the various drone attachable devices 200 include one or more drone sensors 212, communication hubs 206, grippers 210, marking tools 202, maintenance tools 204, welding tools 214, and/or welding equipment 208. In some examples, the drone sensors 212 may include radar, sonar, audio, thermal, global positioning, radiographic, camera, ultrasonic, barcode, and/or optical sensors. In some examples, the marking tools 202 may include lasers, paint sprayers, paint guns, and/or labelers. In some examples, the maintenance tools 204 may include screwdrivers, wrenches, reamers, vacuums, and/or air-blowers. In some examples, the welding tools 214 may include a welding torch, a grinder, and/or an induction heater. In some examples, the welding equipment may include welding-type power supplies, welding wire feeders, and/or shielding gas containers. In some examples, some maintenance tools 204 may also be used for welding operations (e.g., air blower may be coupled with shielding gas container to provide shielding gas during welding, vacuum may be used as a fume extractor during welding, etc.).

In some examples, the communication hub 206 may comprise hub communication circuitry configured to communicate with certain welding assets 500, location beacons 420, gateways 440, tags 480, servers 410, and/or mobile devices 404, discussed further below. In some examples, the communication hub 206 may comprise hub communication circuitry configured for shorter range communications such as, for example, via a short wavelength ultra-high frequency protocol (commonly referred to as Bluetooth), an IEEE 802.15.4 standard protocol (commonly referred to as Zigbee), a near field communication (NFC) protocol, and/or a radio frequency identification (RFID) protocol. In some examples, the communication hub 206 may comprise hub communication circuitry configured for longer range wireless communications, such as, for example, via a cellular and/or IEEE 802.11 standard (commonly referred to as WiFi) protocol. In some examples, the communication hub 206 may comprise hub communication circuitry configured for communication with a global positioning system (GPS). In some examples, the communication hub 206 may comprise hub communication circuitry configured for longer range and shorter range communication, and/or GPS.

Figures 3A, 3B, 3C, 3D:
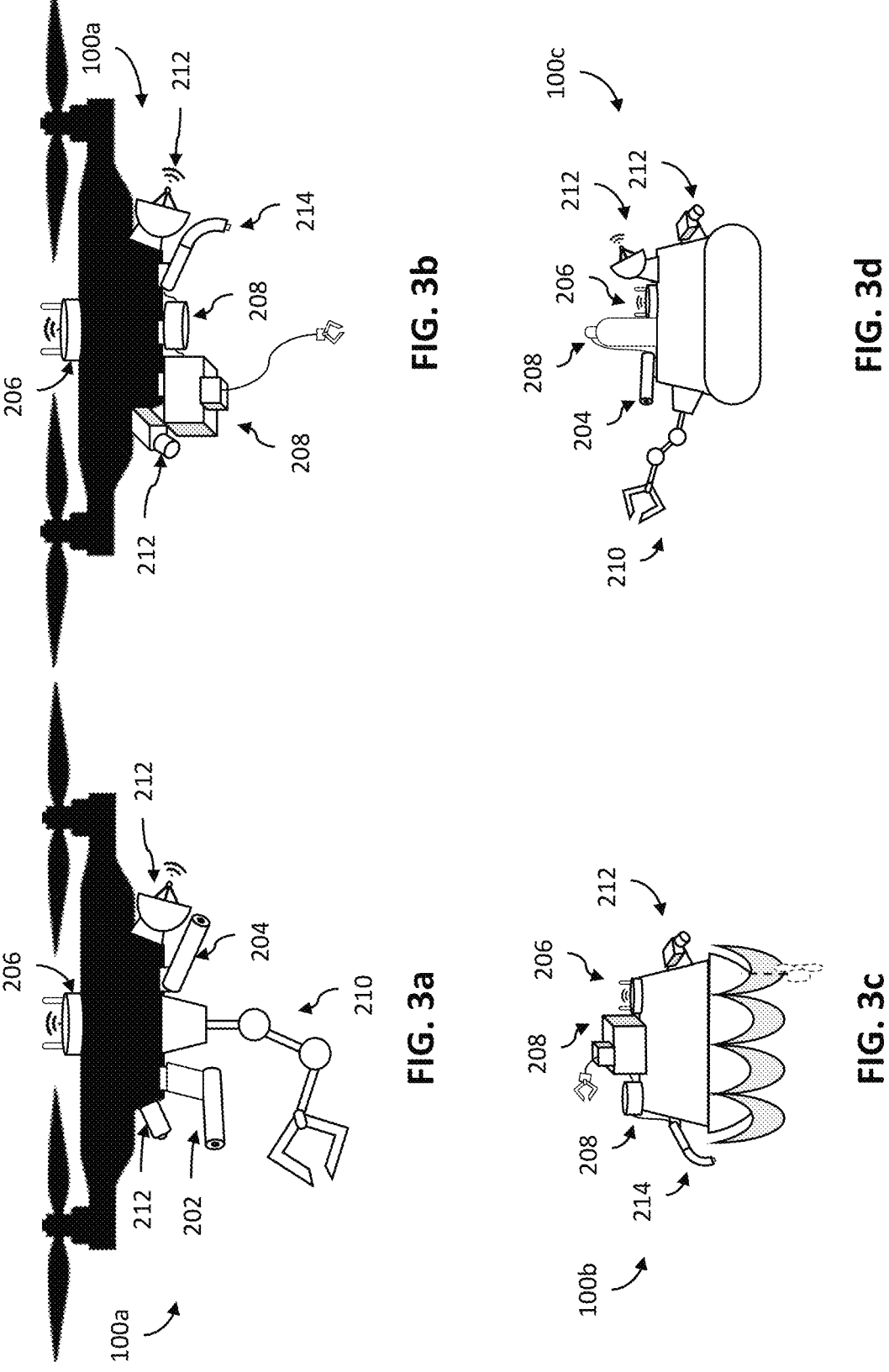
FIGS. 3a-3d depict the example drones of FIGS. 1a-1c with various example attached devices, in accordance with aspects of this disclosure.

FIGS. 3*a*-3*d* show drones 100 with various drone attachable devices 200 coupled to their attachment ports 108. In the example of FIG. 3*a*, an example aerial drone 100*a* has a communication hub 206, two drone sensors 212, a marking tool 202 (e.g., a paint gun), a maintenance tool 204 (e.g., an air blower), and a gripper 210 coupled to its attachment ports 108. In the example of FIG. 3*b*, another example aerial drone 100*a* has attached to its attachment ports 108 a communication hub 206, two drone sensors 212, two pieces of welding equipment 208 (i.e., a welding-type power supply coupled to a wire feeder), and a welding tool 214 (e.g., a welding torch) coupled to the welding equipment 208.

In the example of FIG. 3*c*, an aquatic drone 100*b* is shown with a communication hub 206, a drone sensor 212, two pieces of welding equipment 208 (i.e., a welding-type power supply coupled to a wire feeder), and a welding tool 214 (e.g., a welding torch) coupled to the welding equipment 208. In the example of FIG. 3*d*, a ground drone 100*c* is shown with a communication hub 206, two drone sensors 212, a gripper 210, welding equipment 208 (i.e., a shielding gas container), and a maintenance tool 204 (e.g., an air blower) attached to its attachment ports 108. As shown, the maintenance tool 204 is coupled to the welding equipment 208 (e.g., so as that the air blower may blow out shielding gas from the gas container instead of ambient air). While only one ground drone 100*c* is shown in the example of FIG. 3*d* for the sake of simplicity, similar examples may apply to the other ground drones 100*c* of FIGS. 1*c*-1*e*.

In the examples of FIGS. 3*b* and 3*c*, the welding equipment 208 comprises a welding-type power supply that includes a (e.g., spring loaded) retractable cord reel configured to extend and/or retract an electrical cord in electrical communication with the welding-type power supply. A clamp is connected to the end of the electrical cord for attachment to a workpiece or work table. In some examples, the welding-type power supply may be configured to convert input power (e.g., internal battery power) to a welding-type output power that is output via the electrical cable, clamp, wire feeder, and/or attached welding tool 214. In the examples of FIGS. 3*a* and 3*d*, the gripper 210 includes an articulable robotic arm with multiple joints coupled to a gripping end effector configured to controllably grip, hold, and release various objects. In some examples, the gripper 210 may include control circuitry configured to control the gripper 210 and/or an independent power source.

Figure 4:
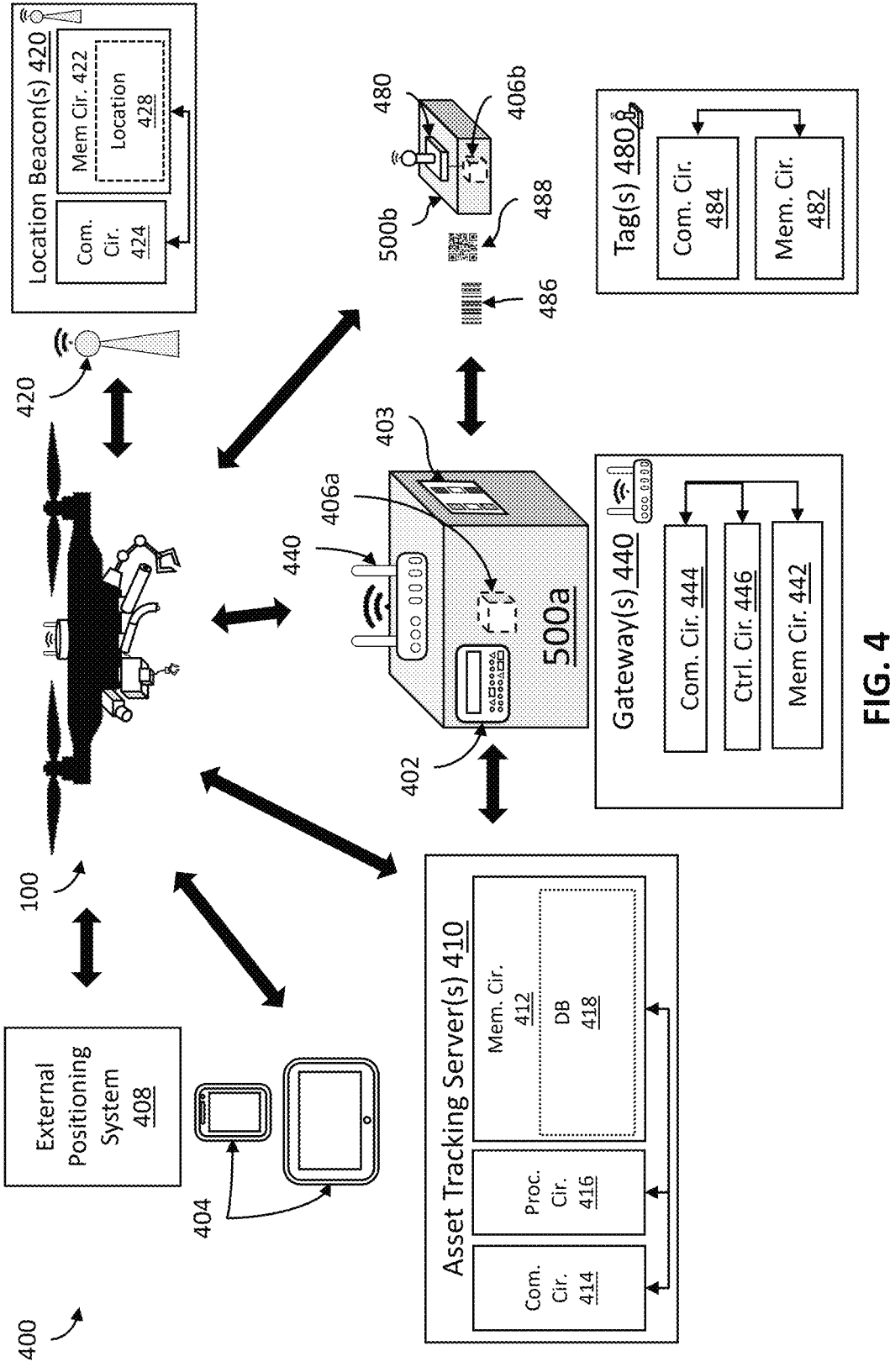
FIG. 4 shows an example drone as part of an example welding asset tracking system, in accordance with aspects of this disclosure.

FIG. 4 depicts an example welding system 400 that uses a drone 100. As shown, the welding system 400 includes an asset tracking server 410 configured to keep track of one or more welding assets 500, a local positioning system comprising one or more location beacons 420, and an asset tracking network comprising several welding assets 500 interconnected via one or more gateways 440 and/or tags 480. As shown, the gateway(s) 440 and/or tag(s) 480 are retained by the one or more welding assets 500.

Figure 5:
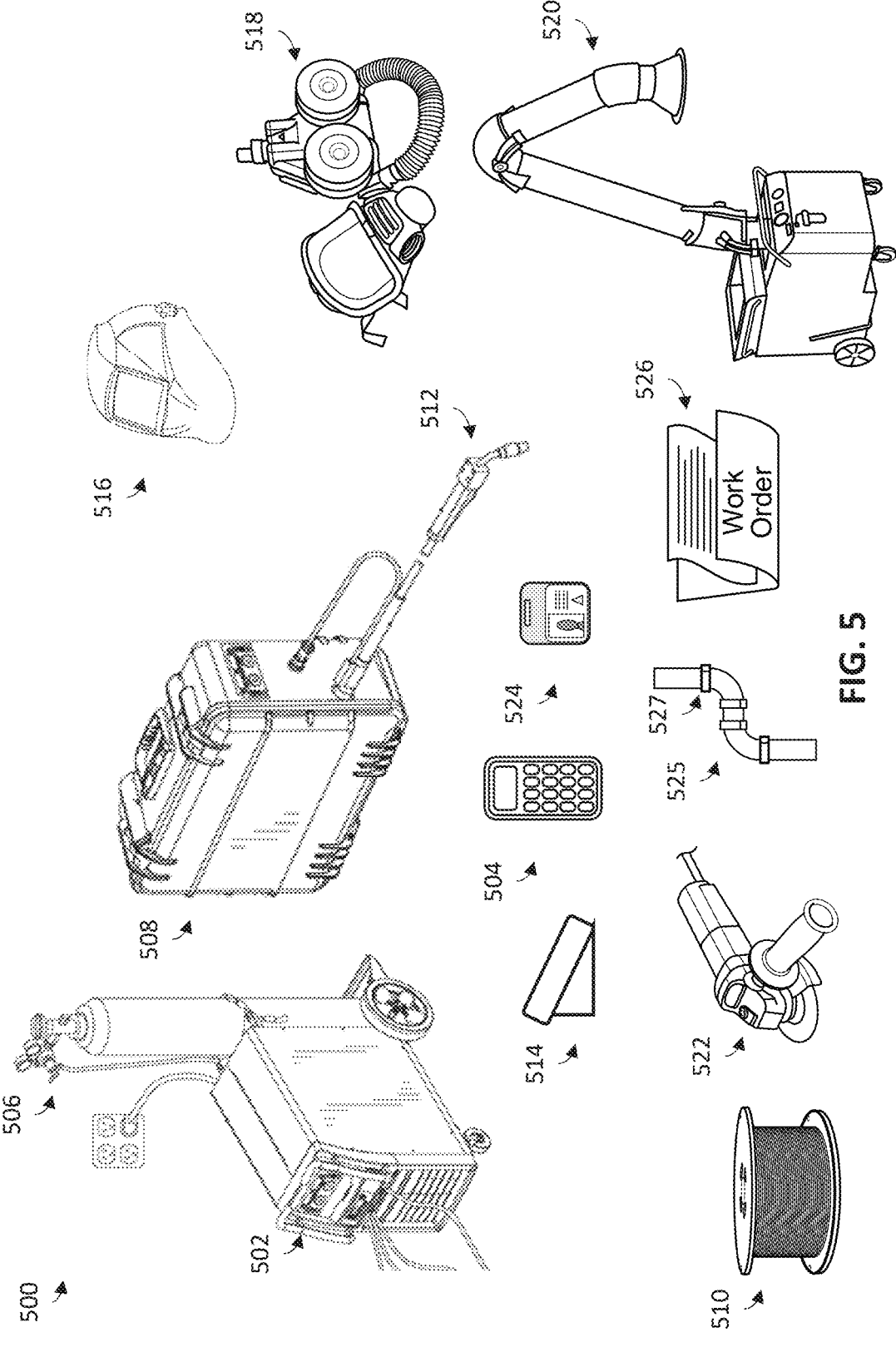
FIG. 5 shows various example welding assets, in accordance with aspects of this disclosure.

A welding asset 500, as used herein, may refer to any device, equipment, accessory, and/or tool used for welding and/or welding-type activities (e.g., metal fabrication, induction heating, grinding, polishing, plasma cutting, etc.). Common welding assets 500 may include a welding (and/or welding-type) power supply 502, a power supply pendant 504, a gas bottle regulator 506, a welding wire feeder 508, a wire spool 510, a welding torch 512, a foot pedal 514, a welding helmet 516, a powered air-purifying respirator (PAPR) 518, a fume extractor 520 (e.g., to extract welding fumes), a grinder 522, an operator id badge 524, welding material 525 (e.g., welding workpiece(s)), and a welding work order 526 (e.g., affixed to a bin or pallet containing welding material 525, or the welding material 525 itself). In some examples, the welding torch 512 may be a welding gun or plasma torch. In some examples, the welding torch 512 may be robot and/or machine operated. In the example of FIG. 5, the welding material 525 further includes a weld 527. In some examples, the welding material 525 may include several welds 527. In some examples, one or more welds 527 may connect together several pieces of welding material 525 (e.g., to make a part).

In the example of FIG. 4, each welding asset 500 includes one or more asset sensors 406. In some examples, the one or more asset sensors 406 may be configured to continuously and/or periodically sense, detect, measure, and/or record sensor data relating to the operation(s) (and/or error(s)) of that particular welding asset 500. For example, a welding power supply 502 may have one or more asset sensors 406 configured to sense, detect, measure, and/or record an input, intermediate, and/or output current and/or voltage, an arc time, a cooling airflow amount, a cooling device (e.g., fan) on time, a weld start/stop time, and/or a total energy amount outputted. As another example, a wire feeder 508 may have one or more asset sensors 406 configured to sense, detect, measure, and/or record a wire feed speed, a motor current, motor voltage, a cooling airflow amount, a cooling device (e.g., fan) on time, roller torque, roller speed, and/or a total amount of filler material output. As another example, a gas regulator 506 may have one or more asset sensors 406 configured to sense, detect, measure, and/or record gas flow rate, gas temperature, gas mixture, and/or total gas output. As another example, a welding helmet 516 may have one or more asset sensors 406 configured to sense, detect, measure, and/or record temperature in and/or around the welding helmet 516, air quality in and/or around the welding helmet 516, motion of the welding helmet 516, whether the helmet 516 is in a darkened state (e.g., for auto-darkening helmets), and/or the total amount of time spent in the darkened state (and/or undarkened state). As another example, a welding torch 512 may have one or more asset sensors 406 configured to sense, detect, measure, and/or record trigger activation start/stop time, activation duration, arc time, position (e.g., with respect to welding material 525 and/or a fixture), orientation (e.g., with respect to welding material 525 and/or a fixture), motion (e.g., with respect to welding material 525 and/or a fixture), current, and/or voltage. As another example, a foot pedal 514 may have one or more asset sensors 406 configured to sense, detect, measure, and/or record pedal activation start/stop time, activation duration, and/or activation pressure. As another example, a pendant 504 may have one or more asset sensors 406 configured to sense, detect, measure, and/or record a recent command history. As another example, an operator badge 524 may have one or more asset sensors 406 configured to sense, detect, measure, and/or record a scanning history (e.g., where the badge is scanned when entering/exiting certain areas and/or using certain assets). As another example, a PAPR 518 or fume extractor 520 may have one or more asset sensors 406 configured to sense, detect, measure, and/or record air circulation amounts, air quality, air temperature, and/or a condition of a filter.

In some examples, the one or more asset sensors 406 may detect and/or record a time corresponding to the sensing, detection, measurement, and/or recording of the sensor data. In some examples, one or more of the welding assets 500 may have no asset sensor 406. In some examples, a stand-alone asset sensor 406 configured to be removably attached to some third party (e.g., competitor) welding asset may be considered a welding asset 500 in and of itself. For example, a Hall Effect sensor or magnetic reed switch sensor configured to be attached to a welding cable and/or detect current through the welding cable may be fitted with its own tag 480, effectively making the asset sensor 406 itself a welding asset 500. As another example, an air flow sensor configured to be attached to a welding power supply 502 (e.g., within the interior and/or in fluid communication with external vents) may be configured to detect cooling air circulating through the welding power supply 502 and fitted with its own tag 480, effectively making the asset sensor 406 itself a welding asset 500.

In the example of FIG. 4, each asset sensor 406 has an electrical and/or communication link to a tag 480 or gateway 440 retained by a welding asset 500. Through this link, sensor data sensed, detected, measured, and/or recorded by the sensor may be communicated to the tag 480 and/or gateway 440 retained by the welding asset 500. As shown, the tag 480 and gateway 440 have tag memory circuitry 482 and gateway memory circuitry 442, respectively, configured to store the sensor data. In some examples, the tag memory circuitry 482 and/or gateway memory circuitry 442 may also store a time corresponding to the detection, measurement, recordation, and/or reception of the sensor data. In some examples, the tag memory circuitry 482 and/or gateway memory circuitry 442 may also store some other data related to the welding asset 500. The tag memory circuitry 482 and/or gateway memory circuitry 442 may also store an identifier (e.g., serial number) that is unique within the welding system 400 and/or associated with the welding asset 500 retaining the tag 480 or gateway 440 (and/or associated with the tag 480 or gateway 440 itself).

In some examples, smaller and/or less sophisticated welding assets 500b (e.g., wire spools 210, work orders 526, welding material 525, operator badges 524, welding guns 212, grinders 522, welding helmets 216, etc.), and/or welding assets 500b that change location frequently, may retain tags 480. In some examples, the tags 480 may be relatively cheap and/or simple devices and/or mechanisms. In the example of FIG. 4, the tag 480 includes tag communication circuitry 484 and tag memory circuitry 482 in electrical communication with one another. As discussed above, the tag memory circuitry 482 may store sensor data, one or more identifiers, and/or other data related to the retaining welding asset 500b. The tag communication circuitry 484 may be configured for shorter range communication, such as, for example, via a short wavelength ultra-high frequency protocol (commonly referred to as Bluetooth), an IEEE 802.15.4 standard protocol (commonly referred to as Zigbee), a near field communication (NFC) protocol, and/or a radio frequency identification (RFID) protocol. In some examples, the tag communication circuitry 484 may communicate data (i.e., tag data) stored in the tag memory circuitry 482 via the tag communication circuitry 484.

In some examples, a tag 480 may be so simple as to have no circuitry. For example, a simple welding asset 500 (e.g., wire spool) with no asset sensor 406 may record no dynamic data and/or have no need of dynamically updatable memory circuitry. In such an example, a tag 480 may be implemented via a (e.g., linear and/or one dimensional) barcode 486 or matrix (and/or two dimensional) barcode 488. In some examples, the tag 480 (and/or barcode 486 or matrix barcode 488) may be retained on an outside of the welding asset 500a or within a housing, chassis, cover, etc. of the welding asset 500a.

In some examples, larger sized and/or more sophisticated welding assets 500a (e.g., welding helmets 216, wire feeders 208, power supplies 202, etc.), and/or welding assets 500 that only change locations rarely or occasionally, may retain gateways 440. In some examples, the gateway retaining welding assets 500a may have existing circuitry (e.g., memory, control, and/or communication circuitry) that can be supplemented relatively easily and/or cheaply to give the welding assets 500a capabilities of a gateway 440.

In the example of FIG. 4, the gateway retaining welding asset 500a includes an asset interface 402 and an information panel 403. As shown, the asset interface 402 includes a plurality of inputs (e.g., buttons, knobs, dials, switches, etc.) and a display screen. In some examples, the asset interface may additionally, or alternatively, include one or more audio inputs and/or outputs (e.g., microphones and/or speakers). As shown, the information panel 403 includes a plurality of visual indicators (e.g., status lights). In some examples, the visual indicators may be configured to change state (e.g., on/off, color, intensity, shape, size, etc.) in response to state and/or status changes of the welding asset 500a.

In the example of FIG. 4, the gateway 440 includes gateway memory circuitry 442, gateway control circuitry 446, and gateway communication circuitry 444 in electrical communication with one another. In some examples, the gateway 440 may additionally be linked to a barcode reader. In some examples, the gateway memory circuitry 442 may store identifiers, tag data (e.g., obtained from one or more tags 480 in communication with the gateway 440), gateway data (e.g., obtained from one or more other gateways 440 in communication with the gateway 440), and/or sensor data (e.g., from the asset sensor(s) 406a of the gateway retaining welding asset 500). In some examples, the gateway control circuitry 446 controls the operation of the gateway 440.

In some examples, the gateway communication circuitry 444 may be configured for long range, short range, and/or GPS communication (as described above with respect to the communication hub 206). In some examples, the gateway 440 may obtain tag data from nearby tags 480 and/or gateway data from other nearby gateways in communication range. In some examples, the gateway 440 may be in communication with an external positioning system 408 (e.g., GPS, Wifi, and/or cellular positioning system). In some examples, the gateway communication circuitry 444 may enable communication with the external positioning system 408. In some examples, the external positioning system 408 may provide the gateway 440 with a position (e.g., latitude and/or longitude) of the gateway 440 and/or retaining welding asset 500a via the external positioning system 408 and/or gateway communication circuitry 444.

In the example of FIG. 4, the gateways 440 may be in communication (e.g., short range communication) with a local positioning system comprising one or more location beacons 420. In some examples, the local positioning system may be used to estimate and/or determine a (relative, local, and/or global) position of a gateway 440, tag 480, welding asset 500, and/or drone, such as, for example, in situations where the external positioning system 408 is unavailable, unreachable, and/or otherwise not an option. In some examples, multiple location beacons 420 may be positioned throughout a welding area to provide a dense, granular, and/or more precise local positioning system.

In the example of FIG. 4, the location beacon 420 of the local positioning system includes beacon memory circuitry 422 and beacon communication circuitry 424 in electrical communication with one another. As shown, the beacon memory circuitry 422 stores a location 428 of the beacon 420. This beacon location 428 may be a relative position (e.g., 100 feet NW of beacon 2, halfway between front door and western window, etc.), a local position (e.g., welding cell 5, back door, front wall, loading bay, etc.), and/or a global position (e.g., 41.8823° N, 87.6404° W). In some examples, the beacon location 428 may be communicated to gateways 440 and/or communication hubs 206 in communication range via beacon communication circuitry 424.

In some examples, the gateways 440 and/or drones 100 of the welding system 400 may determine their positions via the external positioning system 408 and/or local positioning system. For example, a gateway 440 in communication with the external positioning system 408 may determine its global position via gateway communication circuitry 444, and send this position to the asset tracking server(s) 410. Thereafter, the asset tracking server 410 (and/or the gateway 440 itself) may determine and/or estimate a position of any gateways 440 and/or tags 480 for which the gateway 440 has obtained (and/or communicated) data. As another example, a drone 100 that cannot access the external positioning system 408 may nonetheless access one or more location beacons 420 of the local positioning system and thereby estimate and/or determine its position based on the beacon locations 428 of the location beacons 420. Thereafter, the drone 100 (and/or some device in communication with the drone 100) may determine and/or estimate a position of any nearby gateways 440, tags 480, and/or welding assets 500. In some examples, one or more gateways 440 and/or tags 480 may have their position stored in their own respective memory circuitry, so that position may be determined without resorting to an external positioning system.

In the example of FIG. 4, the drone 100 is in communication with one or more mobile devices 404 (e.g., via communication hub(s) 206). In some examples, the drone remote controller 120 may be considered a mobile device 404. In some examples, the mobile devices 404 may be carried by one or more welding operators. In the example of FIG. 4, the gateway 440 and drone 100 are also in communication with one or more asset tracking server(s) 410. In some examples, the gateway 440 and/or drone 100 (e.g., via communication hub(s) 206) may be in communication with the asset tracking server(s) 410 through a network 101 (e.g., local area network, wide area network, internet, etc.). In some examples, the gateway 440 and/or drone 100 may be in communication with the asset tracking server(s) 410 directly, without going through a network. In some examples, the asset tracking server(s) 410 may be implemented in one or more gateways 440. In some examples, the drones 100 (e.g., with communication hub(s) 206) and/or gateways 440 may send information obtained from other gateways 440 and/or tags 480 to the asset tracking server(s) 410 (and/or mobile device(s) 404).

In the example of FIG. 4, the one or more asset tracking servers 410 include server communication circuitry 414, server processing circuitry 416, and server memory circuitry 412 in electrical communication with one another. In some examples, only one asset tracking server 410 may be used. In some examples, multiple asset tracking servers 410 may be used. As shown, the one or more asset tracking servers

410 are in communication with one or more gateways 440 and/or drones 100. In some examples, the server communication circuitry 414 may facilitate communication with the gateways 440 and/or drones 100 (and/or intervening network(s)).

In the example of FIG. 4, the server memory circuitry 412 stores an asset tracking database 418. In some examples, the asset tracking database 418 may store data obtained from the gateways 440, hubs 160, tags 480, and/or asset sensors 406 of the welding system 400. In some examples, the asset tracking database 418 may be stored in the server memory circuitry 412 of one asset tracking server 410. In some examples, duplicates of the asset tracking database 418 may be stored across several asset tracking servers 410. In some examples, different portions of the asset tracking database 418 may be stored in several different asset tracking servers 410. In some examples, the server processing circuitry 416 may control the operation of the asset tracking server 410 and/or asset tracking database 418. In some examples, the server processing circuitry 416 may comprise one or more processors.

In some examples, the server(s) 410 (e.g., via processing circuitry 416) may organize and/or store data received via the asset tracking network in the asset tracking database 418. In some examples, the server(s) 410 may further query and/or parse the data in the asset tracking database 418, such as in response to one or more user requests (e.g., received from a terminal, mobile device 404, communication hub 206, drone 100, and/or other device in communication with the asset tracking server(s) 410). For example, the asset tracking server 410 may receive one or more requests to locate a particular welding asset 500, a particular welding asset type, welding assets 500 in a particular location, welding assets 500 performing a particular operation, welding assets 500 used by a particular operator, etc. In response, the asset tracking server 410 may query and/or parse the data in asset tracking database 418 to respond to the request.

Figure 6:
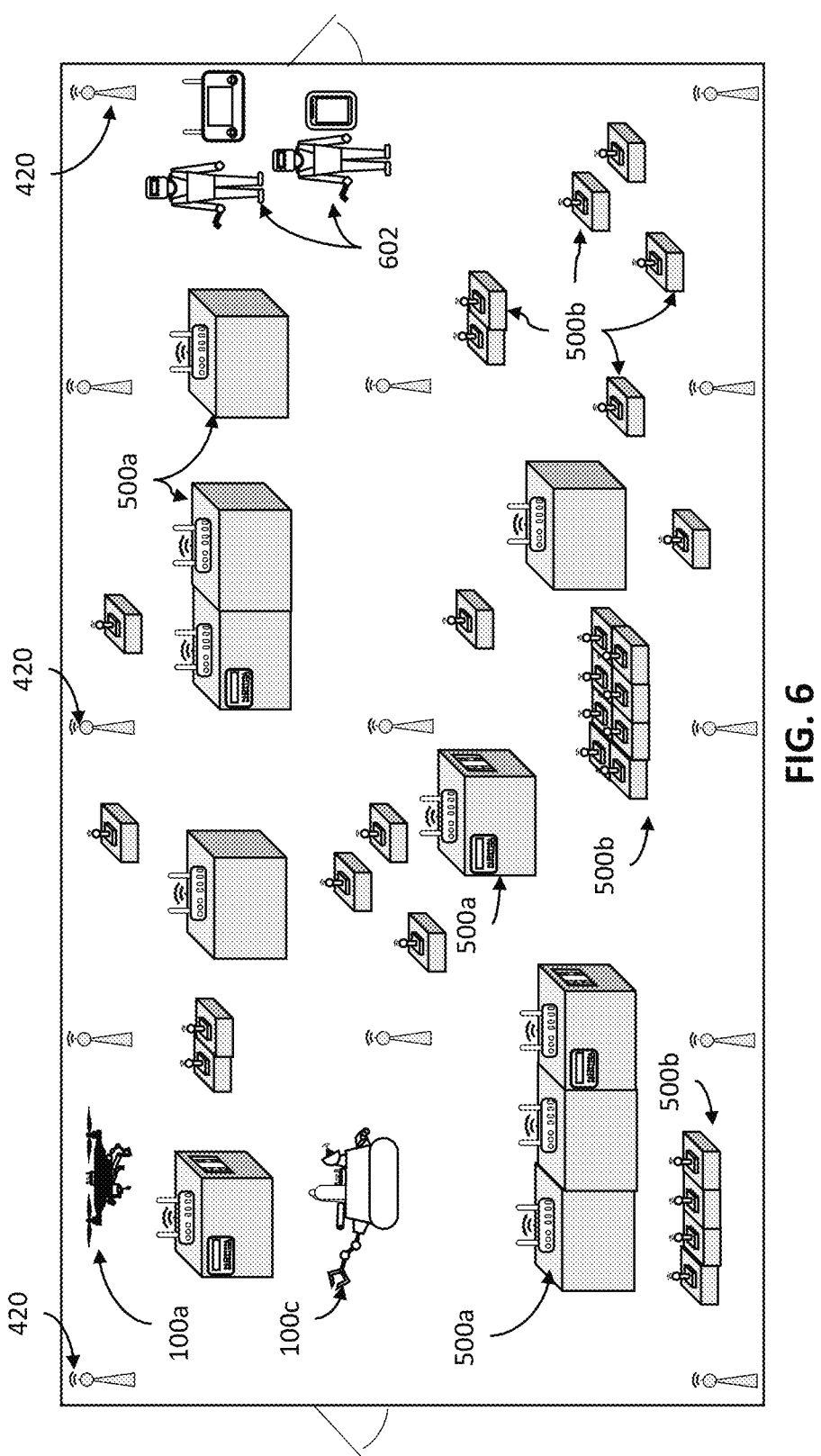
FIG. 6 is a diagram illustrating an example welding area with example drones, in accordance with aspects of this disclosure.

FIG. 6 is a diagram illustrating components of the welding system 400 distributed within an example welding area 600. As shown, several gateway retaining welding assets 500a and tag retaining welding assets 500b are positioned throughout the welding area 600. A plurality of location beacons 420 are also arranged in a grid like configuration within the welding area 600. In some examples, the grid like configuration may increase the likelihood that there will be at least one location beacon 420 nearby that can be used to determine position. Two welding operators 602 with a mobile device 104 and a drone remote controller 120 are also shown at one end of the welding area 600. An aerial drone 100a and a ground drone 100c are shown at the other end of the welding area 600. In some examples, the drones 100 may be sent to collect information and/or perform one or operations by the operators 602. In some examples, the drones 100 (and/or one or more swarms of drones 100) may communicate and/or collaborate to collect the information and/or perform the one or operations.

Figure 7:
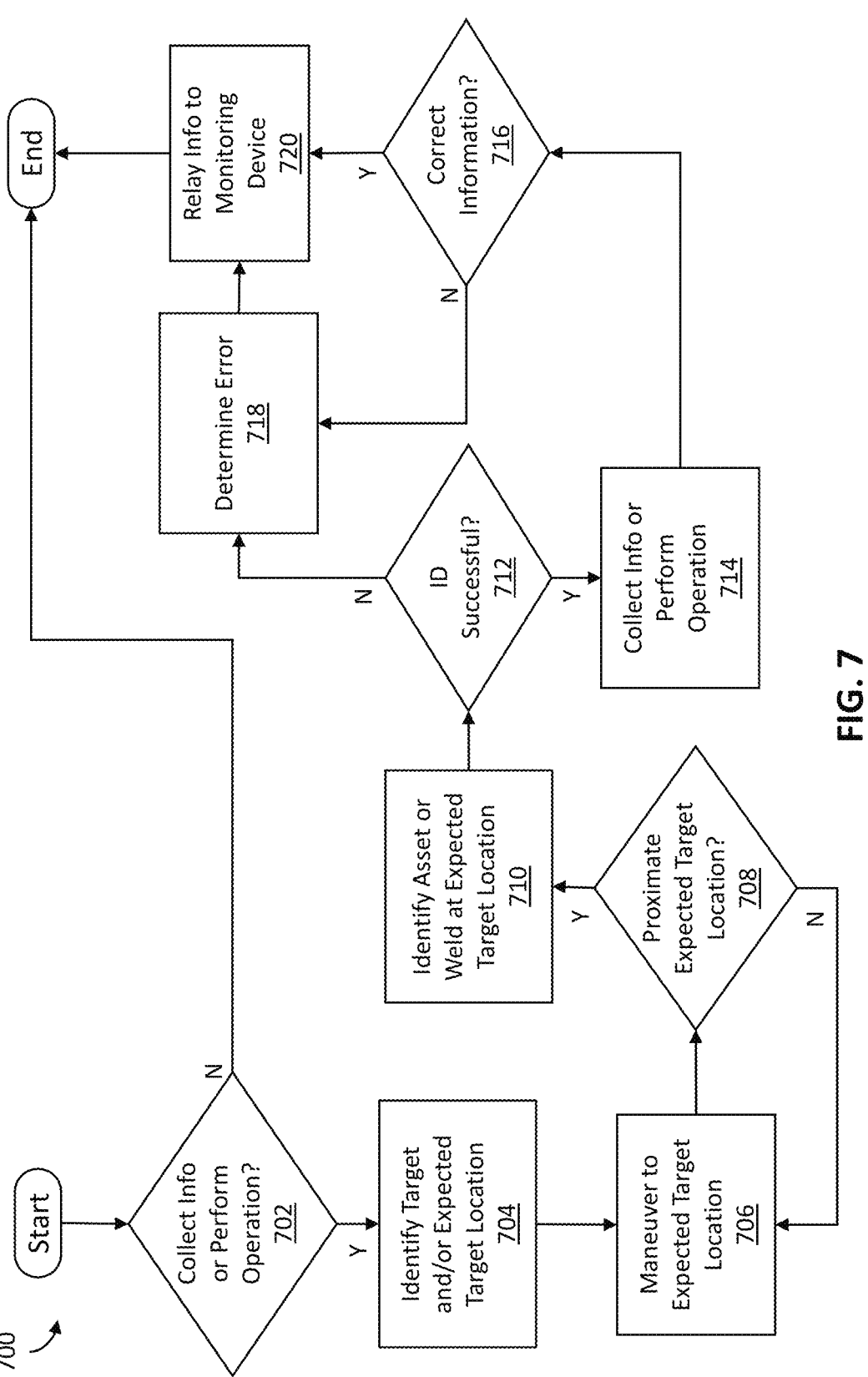
FIG. 7 is a flowchart illustrating an example drone program of the drone components of FIG. 2, in accordance with aspects of this disclosure.

FIG. 7 is a flowchart illustrating an example drone program 700 stored in the drone memory circuitry 116 depicted in FIG. 2. In some examples, the drone program 700 may be implemented in computer (and/or processor) readable (and/or executable) instructions. While shown as being stored in drone memory circuitry 116, in some examples, the drone program 700 may be implemented in discrete analog and/or digital circuitry.

In the example of FIG. 7, the drone program 700 begins at block 702. At block 702, the drone program 700 determines whether the drone 100 should commence collecting welding information and/or performing some welding, pre-welding, and/or post-welding operation. In some examples, the determination at block 702 may comprise determining whether a signal indicative of a command to commence collecting welding information and/or performing an operation has been received (e.g., from remote control 120, mobile device 404, and/or asset tracking server(s) 410). In some examples, the determination at block 702 may comprise determining whether a drone schedule 701 stored in drone memory circuitry 116 indicates it is time to commence collecting welding information and/or performing an operation. In some examples, the drone schedule 701 may comprise one or more collection tasks and/or operations to be performed correlated with one or more dates and/or times, and the determination may comprise a comparison of the one or more dates and/or times with the current date and/or time (e.g., as indicated by clock circuitry of the drone control circuitry 114). If the drone program 700 determines no collection task or operation should be performed, then the drone program 700 ends. If the drone program 700 determines that one or more collection tasks and/or operations should be performed, the drone program 700 proceeds to block 704.

In the example of FIG. 7, the drone program 700 identifies one or more information collection and/or operation performance targets, as well as their expected target location(s), at block 704. In some examples, such targets may comprise one or more welding assets 500, welds 527, welding areas 600, welding material 525, and/or other appropriate items and/or areas. In some examples, the target(s) and/or target location(s) may be identified by the stored schedule 701 and/or through one or more command signals (e.g., received from the remote control 120, mobile device 404, and/or asset tracking server 410). In some examples, the target(s) may be identified via an identifier and the drone 100 may send one or more signals representative of the identifier(s) to the asset tracking server 410 (and/or asset tracking database 418) to determine the expected target location. In such an example, the asset tracking server 410 may respond with one or more signals representative of the last known (and/or reported) location of the identified target (e.g., identified from the asset tracking database 418).

In the example of FIG. 7, the drone program 700 proceeds to block 706 after block 704. At block 706, the drone program 700 maneuvers the drone 100 to the target location. In some examples, the maneuvering may be performing manually by an operator (e.g., via the remote control 120). In some examples, the navigation system 110 of the drone 100 may conduct the maneuvering (e.g., using the propulsion system 106). In some examples, the navigation system 110 may make use of one or more maps (e.g., stored in drone memory circuitry 116 and/or the navigation system 110) to maneuver the drone 100. In some examples, the drone 100 may communicate with one or more external positioning systems 408 (e.g., via communication hub 206 and/or drone communication circuitry 112) to determine the real time position(s) of the drone 100 in relation to the expected target location(s), and/or to determine one or more maps, layouts, and/or paths for the navigation system 110 to use to maneuver the drone 100. In some examples, the drone 100 may communicate with the local positioning system (e.g., the one or more location beacons 420) to determine (and/or estimate) the real time position of the drone 100 in relation to the expected target location(s), and/or to determine one or more maps, layouts, and/or paths for the navigation system 110 to use to maneuver the drone 100.

In the example of FIG. 7, the drone program 700 proceeds to block 708 after block 706. At block 708, the drone program 700 determines whether the drone 100 is proximate the expected target location (e.g., via the external and/or local positioning systems). If the drone 100 is not proximate the expected target location, the drone program 700 returns to block 706 and continues maneuvering. If the drone 100 is proximate the expected target location, the drone program 700 proceeds to block 710.

At block 710 the drone program 700 attempts to identify the target at the expected target location. In some examples, this attempted identification may comprise using one or more attached drone sensors 212 to survey the area and/or attempt to locate the target. As another example, where the target is a welding asset 500, the drone 100 may use the communication hub 206 to attempt to communicate (e.g., via short range communication) with a tag 480 or gateway 440 retained by the welding asset 500.

In the example of FIG. 7, the drone program 700 proceeds to block 712 after block 710. At block 712, the drone program 700 determines whether the attempted identification at block 710 was successful. If the identification was not successful, the drone program 700 determines that there has been some error at block 718, and then proceeds to block 720 where the error is reported (e.g., to a mobile device 404, remote control 120, and/or asset tracking server 410). In the example of FIG. 7, the drone program 700 ends after block 720. However, in some examples, the drone program 700 may instead return to block 704 or block 706 instead of ending.

In the example of FIG. 7, the drone program 700 proceeds to block 714 after block 712 if the attempted identification at block 710 was successful. At block 714, the drone program 700 collects welding related information from the target, and/or performs one or more welding, pre-welding, and/or post-welding related operations on the target. In some examples, the drone 100 (and/or drone program 700) may collaborate and/or communicate (e.g., via drone communication circuitry 112 and/or communication hub 206) with one or more other drones 100 (and/or drone programs 700) to collect the welding information and/or perform the welding, pre-welding, and/or post-welding related operation(s). In some examples, the operation to be performed may be a cleanup operation (e.g., via a vacuum, blower, and/or other maintenance tool 204), a preheating operation (e.g., via an induction heater, welding torch, and/or other welding tool 214), a marking operation (e.g., via a marking tool 202), a delivery operation (e.g., via gripper 210), a collection operation (e.g., via gripper), a maintenance operation (e.g., via a maintenance tool 204), a grinding operation (e.g., via a grinder), a fume extraction operation (e.g., via a vacuum and/or other maintenance tool 204), a shielding gas discharge operation (e.g., via a blower and/or a gas container), and/or an arc welding operation (e.g., via a welding-type power supply, wire feeder, welding torch, gas container, blower, and/or other appropriate welding equipment 208, welding tools 214, and/or maintenance tools 204).

In some examples where the drone program 700 collects welding related information, the welding related information may comprise location data. For example, the drone 100 may first maneuver to a welding asset 500 and/or welding area believed to be near a target welding asset 500. Thereafter, the drone 100 may locate and/or maneuver to the target welding asset 500 and collect the actual location information of the target welding asset 500 (e.g., by determining its own location via the external positioning system 408 and/or local positioning system).

In some examples where the drone program 700 collects welding related information, the welding related information may comprise display panel information, status information, maintenance information, and/or fault information. For example, the drone 100 may use an attached drone sensor 212 to collect display panel information, status information, maintenance information, and/or fault information from a display panel 403, asset interface 402, and/or other portion of one or more welding assets 500 that is indicative of one some status, maintenance, and/or fault information. As another example, the drone 100 may use an attached communication hub 206 and/or drone sensor 212 to collect information from a tag 480 and/or gateway 440 retained by a welding asset, and that information may be indicative of some display panel, status, maintenance, and/or fault information. In some examples where the drone program 700 collects welding related information, the drone 100 may use one or more attached devices to collect information pertaining to air quality, diagnostics, cleanliness, available materials and/or parts, needed materials and/or parts, parts ready for pickup, the welding environment and/or welding cell, sensor data, tag data, gateway data, weld process information (e.g., information specific to one or more welds, such as voltage, current, wire feed speed, gas flow, etc.), part tracking information (e.g., information related to one or more specific parts), job tracking information (e.g., information related to one or more particular welding jobs, job sessions, operators, welding assets 500, etc.), activity information, (e.g., information related to one or more operating states for different periods of time), quality information, one or more identifiers, other identification information (e.g., an optical/thermal/ultrasonic/radiographic picture and/or video of the target), and/or other pertinent information.

In the example of FIG. 7, the drone program 700 proceeds to block 716 after block 714. At block 716, the drone program 700 determines whether the collected information is correct and/or matches expected collected information. For example, the stored schedule 701 may comprise a periodic maintenance and/or status checking schedule with various expected information to be collected from various welding assets 500, welding areas, welds, etc. In such an example, the drone program 700 may simply continue on with the schedule if everything goes as expected. However, the drone program 700 may return an error and/or ask for additional input if the collected information is unexpected (e.g., indicating some fault, error, needed maintenance, needed supplies, etc.). As shown, the drone program 700 proceeds to block 720 if the collected information matches the expected collected information, and proceeds to block 718 if the collected information does not match the expected collected information. In some examples, the check at block 716 may be omitted or skipped entirely.

At block 720, the drone program 700 relays (e.g., via one or more signals) the collected information back to some device in communication with the drone 100 (e.g., via the communication hub 206 and/or drone communication circuitry 112). In some examples, the device may be a mobile device 404, remote control 120, and/or asset tracking server 410. In some examples, the relay at block 716 may further comprise maneuvering the drone 100 back to communication range and/or close proximity of the device. For example, the target location the drone was sent to may be within some area with limited communication, or the device itself may be in an area with limited communication. In such an example, the drone 100 may have to travel before communicating the collected information. In some examples, the drone 100 may have to travel back to a docking station, and/or dock at the docking station, in order to successfully relay the collected information.

In some examples, the relay at block 716 may comprise the drone 100 transmitting the information (e.g., via the communication hub 206 and/or drone communication circuitry 112) through one or more gateways 440 of the welding system 400. In some examples, such as where the drone 100 performs an operation rather than, or in addition to, collecting data, the drone may 100 relay a signal indicative of a success or failure. In some examples, the drone program 700 may also update the drone schedule 701 as part of the information relay. For example, the drone program 700 may update the drone schedule 701 to indicate that the particular information was successfully or unsuccessfully collected, and/or that the particular operation was successfully or unsuccessfully performed. In some examples, the drone program 700 may adapt and/or change the drone schedule (e.g., in response to the success or failure of the collection and/or operation). For example, the drone program 700 may increase or decrease the scheduled frequency of the collection and/or operation based on its recent success or failure. As another example, the drone program 700 may change the target(s) and/or target location(s) based on information learned during the recent collection and/or operation. In some examples, the drone program 700 may change the drone schedule in response to one or more signals received from the device in communication with the drone 100. After the drone program 700 relays the information at block 720, the drone program 700 ends.

The present disclosure contemplates using one or more drones 100 in large and/or dispersed welding areas, and/or difficult to reach areas. The ability of unmanned drones 100 to quickly navigate large distances and/or reach particular areas may be invaluable, especially when time is a factor. By using attachable and/or detachable devices, the drone 100 may be customized for a particular operational and/or information collection task that may be performed after traveling the large distance and/or reaching the particular area(s).

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to welding, cladding, brazing, plasma cutting, induction heating, carbon arc cutting, and/or hot wire welding/preheating (including laser welding and laser cladding), carbon arc cutting or gouging, and/or resistive preheating.

As used herein, welding-type power refers power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A method, comprising:

maneuvering a drone to an expected equipment location proximate welding equipment via a drone propulsion system or a drone navigation system of the drone;

communicating welding information from the welding equipment to the drone when the drone is proximate the welding equipment;

changing, via the drone, a next target piece of welding equipment or a next expected equipment location based on the welding information; and maneuvering the drone to the next expected equipment location proximate the next target piece of welding equipment via the drone propulsion system or the drone navigation system of the drone.

2. The method of claim 1, further comprising communicating the welding information from the drone to a monitoring device in communication with the drone, wherein communicating the welding information from the welding equipment to the drone comprises receiving at the drone, from the welding equipment, one or more welding equipment radio signals representative of the welding information, and communicating the welding information from the drone to the monitoring device comprises transmitting, from the drone, to the monitoring device, one or more drone radio signals representative of the welding information.

3. The method of claim 1, wherein the drone comprises close proximity communication circuitry to facilitate communication of the welding information, and the close proximity communication circuitry is configured for communication using an IEEE 802.15.4 standard protocol, a short wavelength ultra high frequency protocol, or a near field communication protocol.

4. The method of claim 1, further comprising assisting in a welding operation by performing a marking, grinding, fume extraction, or shielding gas discharge operation using a marking, grinding, vacuum, or blowing tool of the drone.

5. The method of claim 4, wherein the welding information pertains to the welding operation in which the drone assisted.

6. The method of claim 1, further comprising collecting the welding information via a welding equipment sensor of the welding equipment or via communication with nearby welding equipment in proximity to the welding equipment, the welding information relating to a welding operation of the welding equipment or relating to a nearby welding operation of the nearby welding equipment.

7. The method of claim 1, wherein the welding equipment comprises a welding-type power supply, a welding wire feeder, or a shielding gas container or the welding information comprises a welding equipment location, a welding equipment identifier, weld process information, welding job information, welding activity information, or weld quality information.

8. The method of claim 1, further comprising maneuvering the drone, via the drone propulsion system or the drone navigation system of the drone, to a relaying location where the drone can communicate with a monitoring device, and communicating the welding information from the drone to the monitoring device.

9. The method of claim 8, further comprising:

receiving, at the drone, an expected equipment identifier and the expected equipment location of the welding equipment;

after maneuvering the drone to the expected equipment location, receiving, at the drone, an equipment identifier from a nearby piece of welding equipment;

in response to determining the equipment identifier is different than the expected equipment identifier, moving the drone to one or more different locations in a search for the welding equipment;

in response to finding the welding equipment via the drone, determining a drone location of the drone, and determining an equipment location of the welding equipment based on the drone location of the drone, wherein communicating the welding information comprises communicating the drone location of the drone, or the equipment location of the welding equipment, and the welding information from the drone to the monitoring device in communication with the drone; and storing an association between the expected equipment identifier and the equipment location, via the monitoring device.

10. The method of claim 1, wherein the drone is an autonomous drone that autonomously maneuvers to the expected equipment location according to a stored schedule.

11. A welding system, comprising:

welding equipment;

a drone comprising:

a drone propulsion system or a drone navigation system, a drone communication device, processing circuitry, and memory circuitry comprising machine readable instructions that, when executed by the processing circuitry, cause the processing circuitry to:

maneuver the drone to an expected equipment location proximate the welding equipment via the drone propulsion system or the drone navigation system, conduct a communication with the welding equipment via the drone communication device when the drone is proximate the welding equipment, the welding equipment communicating welding information to the drone communication device via the communication, change a next target piece of equipment or a next expected equipment location based on the welding information, and maneuver the drone to the next expected equipment location proximate the next target piece of welding equipment via the drone propulsion system or the drone navigation system of the drone.

12. The system of claim 11, wherein the memory circuitry comprises machine readable instructions that, when executed by the processing circuitry, further cause the processing circuitry to communicate the welding information to a monitoring device via the drone communication device, and wherein:

conducting the communication with the welding equipment via the drone communication device comprises receiving, via the drone communication device, from the welding equipment, one or more welding equipment radio signals representative of the welding information, and communicating the welding information to the monitoring device via the drone communication device comprises transmitting to the monitoring device, via the drone communication device, one or more drone radio signals representative of the welding information.

13. The system of claim 11, wherein the drone communication device comprises close proximity communication circuitry configured for communication using an IEEE 802.15.4 standard protocol, a short wavelength ultra high frequency protocol, or a near field communication protocol.

14. The system of claim 11, wherein the drone further comprises a marking, grinding, vacuum, or blowing tool, and the machine readable instructions, when executed by the processing circuitry, further cause the processing circuitry to assist in a welding operation by performing a marking, grinding, fume extraction, or shielding gas discharge operation using the marking, grinding, vacuum, or blowing tool of the drone, the welding information pertaining to the welding operation in which the drone assisted.

15. The system of claim 11, wherein the welding equipment comprises a welding-type power supply, a welding wire feeder, or a shielding gas container, and the welding information comprises a welding equipment location, a welding equipment identifier, weld process information, welding job information, welding activity information, or weld quality information.

16. The system of claim 11, wherein the welding equipment comprising:

a welding equipment sensor configured to collect the welding information during a welding operation of the welding equipment, the welding information relating to the welding operation of the welding equipment, or a welding equipment gateway configured to collect the welding information via communication with nearby welding equipment, the welding information relating to a nearby welding operation of the nearby welding equipment.

17. The system of claim 11, wherein the machine readable instructions, when executed by the processing circuitry, further cause the processing circuitry to communicate the welding information from the drone to the monitoring device, the system further comprising:

the monitoring device, the monitoring device being configured to:

send an expected equipment identifier and the expected equipment location of the welding equipment to the drone, receive a drone location, or an equipment location, from the drone, and update an association between the expected equipment identifier and the equipment location.

18. The system of claim 17, wherein the machine readable instructions, when executed by the processing circuitry, further cause the processing circuitry to:

receive the expected equipment identifier and the expected equipment location of the welding equipment from the monitoring device, via the drone communication device, after maneuvering the drone to the expected equipment location, receive an equipment identifier from a nearby piece of welding equipment via the drone communication device, and in response to determining the equipment identifier is different than the expected equipment identifier, search for the welding equipment by moving the drone to one or more different locations, in response to finding the welding equipment, determine the drone location of the drone, and determine the equipment location of the welding equipment based on the drone location of the drone, wherein communicating the welding information comprises communicating the drone location of the drone, or the equipment location of the welding equipment, and the welding information to the monitoring device via the drone communication device.

19. The system of claim 11, wherein the machine readable instructions, when executed by the processing circuitry, further cause the processing circuitry to maneuver the drone, via the drone propulsion system or the drone navigation system, to a relaying location where the drone can communicate with a monitoring device, and communicate the welding information from the drone to the monitoring device.

20. The system of claim 11, wherein the drone is an autonomous drone that autonomously maneuvers to the expected equipment location according to a stored schedule.

* * * * *